March 7, 1933.  F. C. FRANK  1,900,178
BRAKE
Filed Oct. 13, 1930   2 Sheets-Sheet 1

INVENTOR.
FREDERICK C. FRANK
BY
ATTORNEY

March 7, 1933.　　　　F. C. FRANK　　　　1,900,178
BRAKE
Filed Oct. 13, 1930　　　2 Sheets-Sheet 2
Fig. 4
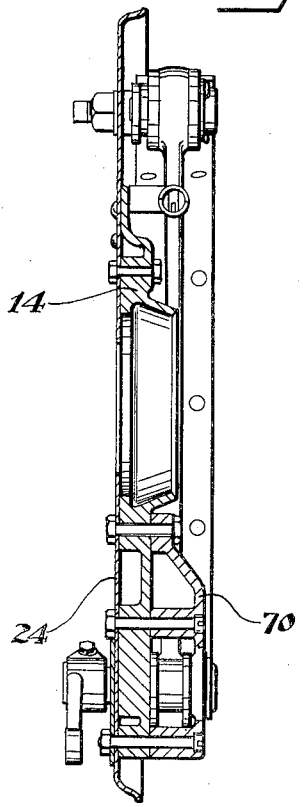
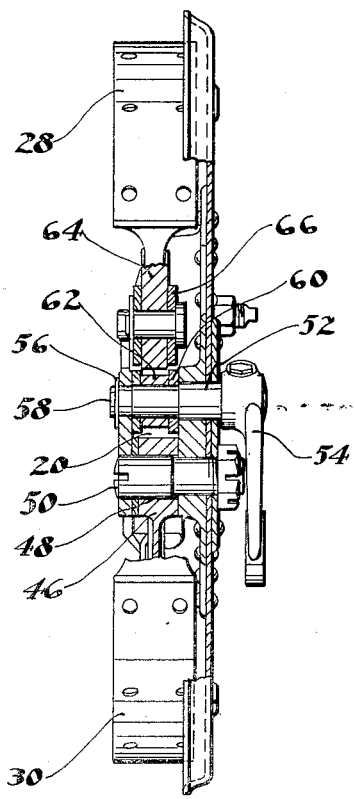
Fig. 3
Fig. 5
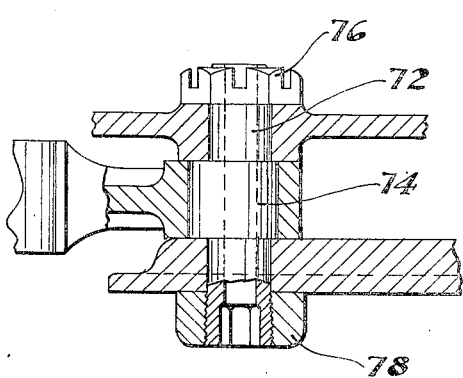
INVENTOR.
FREDERICK C. FRANK
BY
M. W. McConkey
ATTORNEY Patented Mar. 7, 1933

1,900,178

UNITED STATES PATENT OFFICE

FREDERICK C. FRANK, OF SOUTH BEND, INDIANA, ASSIGNOR TO BENDIX BRAKE COMPANY, OF SOUTH BEND, INDIANA, A CORPORATION OF ILLINOIS

BRAKE

Application filed October 13, 1930. Serial No. 488,224.

This invention relates to brakes and more particularly to internal expanding brakes.

An object of the invention is to provide a torque reaction member for a brake structure.

Another object of the invention is to provide a torque reaction member having a portion formed to provide an outboard bearing support for the anchor pins and cam shaft.

Another object of the invention is to provide a brake structure having a torque reaction member designed to support the anchors and cam shaft and to provide a suitable housing for the return spring connecting the friction elements.

A further object of the invention is to provide a torque reaction member adapted to receive or take the torque reaction of the brake and transmit this torque to an axle through suitable means by which the member is secured to the axle flange.

A further object of the invention is to provide a brake structure having means adapted to receive the torque reaction of the brake and transmit this torque to an axle, so that all stress and strain may be relieved from the backing plate of the brake structure.

A further object of the invention is to provide a brake structure having a torque reaction member bolted or otherwise secured to an axle and means associated therewith for protecting the braking elements of the brake from the grease or oil thrown from wheel bearings on the axle.

A further object of the invention is to provide a unique and highly desirable means for adjusting the brake shoes or friction elements with relation to the brake drum.

Yet a further object of the invention is to provide a torque taking member positioned intermediate a supporting flange on an axle and a backing plate or support for shoes or friction elements and means including an outboard support for the operating means for the friction elements.

A still further object of the invention is to provide a brake structure having a torque taking member arranged to relieve the cooperating parts of the brake structure from all stresses and strains, a torque taking member which is highly efficient in operation and yet of marked simplicity as a whole in respect to each of its component parts.

Other objects of the invention will appear from the following description taken in connection with the drawings, and in which:

Figure 3 is a sectional view substantially on line 3—3, Figure 1;

Figure 4 is a sectional view substantially on line 4—4, Figure 1; and

Figure 5 is an enlarged detailed view illustrating the adjustment means for the shoes or friction elements.

Figure 1:
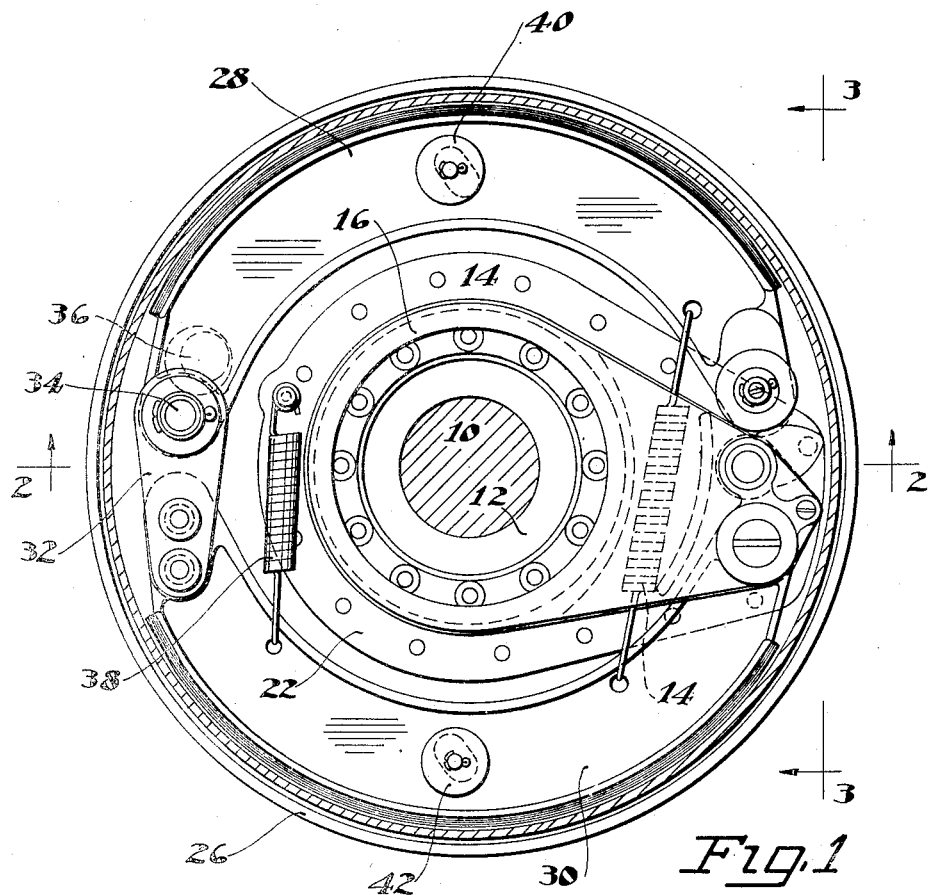
Figure 1 is a vertical sectional view just back of the head of the drum illustrating the torque reaction plate and the friction elements in side elevation.
Figure 2:
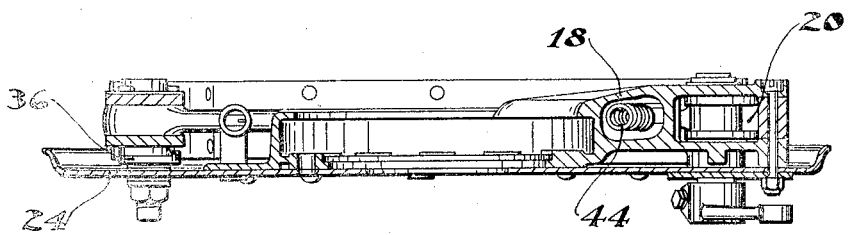
Figure 2 is a sectional view substantially on line 2—2, Figure 1.

Referring to the drawings for more specific details of the invention, 10 represents an axle having a flange 12. As shown, a torque reaction member 14 is bolted or otherwise secured to the flange. This torque reaction member has formed thereon a flange 16 concentric with the flange 12. The flange 16 is suitably cupped to catch and retain oil or grease thrown from the bearings of wheels, not shown, positioned on the axle, thus providing an adequate shield for the braking elements.

The torque reaction member has a portion comprising a housing 18 having a slot 20, the object of which will be hereinafter explained, and a flange 22 to which is bolted or otherwise secured a support or backing plate 24 and associated with the backing plate is a rotatable drum 26 adapted to be secured to a wheel, not shown.

Positioned for movement on the backing plate is a primary shoe 28 and a secondary shoe 30. The secondary shoe has riveted or otherwise secured on its articulated end a plate 32 connected to the articulated end of the primary shoe by a pivot 34 and cooperating with the pivot 34 is an adjusting cam 36 positioned on the backing plate 24. The pivot 34 is normally held against the cam 36 by a coil spring 38 connected between the secondary shoe 30 and the torque reaction member.

As shown, the primary and secondary shoes or friction elements 28 and 30 are supported by steady rests 40 and 42 positioned on the backing plate and connected by a return spring 44 enclosed in the housing 18. The anchored end of the secondary shoe is provided with an enlarged end portion 46 having an opening 48. This enlarged end portion is fitted snugly in the slot 20 and an anchor pin 50 passes transversely through the walls of the torque reaction member, the backing plate and the opening 48 in the anchored end of the shoe. This anchor pin has a double diameter, the larger diameter comprising the anchor pin proper and the smaller diameter the shank by which the pin is secured to the torque reaction member and the backing plate.

A cam shaft 52 is positioned for rotation in the walls of the housing on the torque reaction member transversely of the slot 20. This shaft extends through the backing plate 24 and has secured thereon an operating arm 54. The shaft is retained in position by a split washer 56 fitted in a circumferential groove, not shown, in one end of the shaft, and milled on that portion of the shaft positioned in the slot 20 are oppositely disposed flats 58. Cams 60 are positioned on the shaft and retained against rotation thereon by the flats 58, the cams being suitably spaced as by a spacer 62.

As shown, the movable or force applying end of the primary shoe is provided with an enlarged portion 64 adapted to fit between the cams 60 and positioned for rotation on the opposite sides of the enlarged portion 64 are rollers 66 adapted to engage the cam surfaces, so that upon rotation of the shaft 52, the friction element may be actuated to engage the frictional surface of the drum.

A modified form of the invention is illustrated in Figures 4 and 5. In this modification, the torque reaction member 14 is provided with a removable cover plate 70 secured in position by a plurality of bolts passing transversely through the cover, the torque reaction member and the backing plate. This cover plate provides an adequate housing for the return spring 44 connected between the primary and secondary shoes and an outboard support for the cam shaft and anchor.

This type of torque reaction member may be found highly desirable in instances where the anchor is constructed as shown in Figure 5, because it permits the use of an anchor comprising an eccentric whereby the friction element may be adjusted in relation to the friction surface of the drum.

In this modification, the anchor pin 72 has formed thereon an eccentric 74 adapted to fit in an opening in the anchored end of the shoe between the walls of the torque reaction member defining the slot. The respective ends of the anchor pin 72 have threaded thereupon nuts 76 and 78 and the outer end of the anchor pin is axially bored and broached to receive a wrench, so that the eccentric may be manipulated to position the shoes with correct adjustment with relation to the brake drum.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake structure comprising an annular support having a torque reaction projecting portion at one side thereof, an outboard bearing support on the projecting portion, a backing plate secured to and supported by said support and forming a subassembly therewith, and a friction element supported by the torque reaction member.

2. A brake structure comprising a torque reaction member having a housing, an anchor in the housing, an operating shaft in the housing, a friction element having one end secured to the anchor and its other end engaging the operating member and a return spring connecting the friction elements encased in the housing.

3. In combination with an axle having a flange, a torque reaction member supported on the flange, a backing plate bolted to the torque reaction member and flange, a housing on the torque reaction member, an anchor positioned in the housing and an operating member positioned in the housing, a friction element having one end connected to the anchor and its other end engaging the operating member and a return spring in the housing connecting the respective ends of the friction element.

4. In combination with an axle having a flange, a torque reaction member and a backing plate bolted to the flange, a housing on the backing plate, an anchor positioned in the housing, an operating member positioned in the housing, articulated friction elements positioned for movement on the backing plate, one friction element receiving the anchor and the other friction element engaging the operating cam and a return spring positioned in the housing connecting the separable ends of the friction elements.

In testimony whereof, I have hereunto signed my name.

FREDERICK C. FRANK.